United States Patent
Castellanos et al.

(10) Patent No.: US 9,715,013 B2
(45) Date of Patent: Jul. 25, 2017

(54) INTEGRATABLE ILS INTERLOCK SYSTEM

(71) Applicant: New Bedford Panoramex Corp., Claremont, CA (US)

(72) Inventors: Ken J. Castellanos, Claremont, CA (US); Larry K. Davis, Moreno Valley, CA (US)

(73) Assignee: NEW BEDFORD PANORAMEX CORP., Claremont, CA (US)

( * ) Notice: Subject to any disclaimer, the term of this patent is extended or adjusted under 35 U.S.C. 154(b) by 411 days.

(21) Appl. No.: 14/447,438

(22) Filed: Jul. 30, 2014

(65) Prior Publication Data
US 2015/0145712 A1 May 28, 2015

Related U.S. Application Data

(60) Provisional application No. 61/909,707, filed on Nov. 27, 2013.

(51) Int. Cl.
| | |
|---|---|
| G01S 13/91 | (2006.01) |
| G08G 5/02 | (2006.01) |
| G01S 1/04 | (2006.01) |
| G01S 1/14 | (2006.01) |

(52) U.S. Cl.
CPC ............ *G01S 13/913* (2013.01); *G01S 1/042* (2013.01); *G01S 1/14* (2013.01); *G08G 5/025* (2013.01)

(58) Field of Classification Search
CPC ........ G08G 5/025; G08G 5/02; G01S 13/913; G01S 1/042; G01S 1/14
See application file for complete search history.

(56) References Cited

U.S. PATENT DOCUMENTS

| | | | |
|---|---|---|---|
| 3,115,634 A | * | 12/1963 | Karpeles ................... G01S 1/02 342/413 |
| 6,348,891 B1 | | 2/2002 | Uemura |
| 6,604,030 B1 | | 8/2003 | Davis et al. |

OTHER PUBLICATIONS

OPTO 22 Case Study: New Bedford Panoramex Corporation. 2011. 4 Pages. Accessed Dec. 13, 2016: <http://www.opto22.com/documents/casestudies/1988_Case_Study_New_Bedford_Panoramex.pdf>.*
Szczuka, Edward C. "Universal Instrument Landing System (ILS) Interlock Controller With Remoting Capability". 2007.*

* cited by examiner

*Primary Examiner* — Matthew M Barker
(74) *Attorney, Agent, or Firm* — Stout, Uxa & Buyan; Carlos A. Fisher (57) ABSTRACT

Methods and compositions for preventing opposing ILS systems on a single runway from becoming active at the same time. A physical interlock system employs a physical switch element that may activate a first ILS system or an opposing second ILS system, but is not capable of permitting, and may prevent, opposing ILS systems from being active simultaneously. Also included are methods for preventing opposing ILS systems on a single runway from becoming active, comprising the use of a physical switch preventing activating signals from being sent to opposing ILS systems at the same time.

15 Claims, 3 Drawing Sheets

INTEGRATABLE ILS INTERLOCK SYSTEM

SPECIFIC REFERENCE TO RELATED APPLICATIONS

This non-provisional patent application claims priority to U.S. Provisional Patent Application Ser. No. 61/909,707, filed Nov. 27, 2013, which is hereby incorporated by reference herein in its entirety as part of the present patent application.

FIELD OF THE INVENTION

This invention relates to interlock methods, systems, and apparatus for preventing more than one airport runway instrument landing system (ILS) from radiating opposing aircraft approaches to the same runway, or radiating interfering signals to one or more aircraft receiver. In particularly, the invention describes interlock systems that are not wholly software-based; in preferred examples, the invention may be drawn to interlock methods, systems, and apparatus involving at least one physical fail-resistant or fail-safe component, such as a physical switch component. Preferably, although not always invariably, the interlock systems and apparatus are capable of interfacing with an integrated control and monitoring system (ICMS), linking substantially all, or all, runway visual aids and navigational aids to aircraft guidance and safety at airports, and preferably in which no single component or communications failure can adversely affect the functionality of the system.

BACKGROUND

Airports contain a wide variety of equipment which air traffic control personnel use to aid in the process of launching and recovering aircraft in a safe and efficient manner. Typically, each user interface to this equipment is unique, because there is no common manufacturer and because each equipment component performs a different function. Such an equipment interface may be as simple as a panel of push buttons with incandescent lamps or as complex as a rack of switches and LEDs. Such equipment and interfaces may include runway lights, instrument landing systems (ILS), emergency generators, and other systems that ensure safe management of the aircraft. In the past interfaces were often located in different places in and around the airport, such as the control tower cab, scattered equipment cabinets, or at field locations on or off the runway. The inability to control air traffic, navigational, and visual aids in a single interface creates a clear safety deficit. Additionally, often times different airports have different equipment and interfaces, with the result that even air traffic personnel having long professional experience at one airport would potentially have a long and difficult time learning the systems and interfaces at a different airport.

To improve the reliability and consistency of air traffic control systems, systems and methods have been proposed and implemented to connect all of these various interfaces to a common high-speed network known as an Integrated Control and Monitor System (ICMS) manufactured by the assignee of this application. See, U.S. Pat. No. 6,604,030, hereby incorporated herein by reference in its entirety. The advantage of ICMS is that it allows many the interfaces to be displayed to a controller at a common location a in a graphical user interface (GUI) format that has a common "look and feel". It also allows the controller to selectively control and monitor the equipment from one or more locations. The ICMS further allows the provision of computer controlled interlocks to prevent human error. For example, each physical runway at an airport represents two virtual runways, one handling traffic in one direction, the other handling traffic in the opposite direction. Each of these virtual runways has its own set of equipment. It is therefore imperative that when the traffic direction on a physical runway is changed, ICMS refuses to turn on the equipment for the new virtual runway until the equipment (for example the localizer and the glide slope transmitters) of the previous virtual runway has shut down.

However, the use of software-controlled safety interlocks, such as software-controlled ILS interlocks alone is, while highly reliable, still not absolutely fail safe. Thus, there is still a need for an ILS interlock, preferably capable of interacting with, and as a component of an airport integrated control and monitoring system for runway navigational and safety equipment, that is substantially incapable of permitting the simultaneous activation of such equipment on opposing or conflicting runways.

SUMMARY OF THE INVENTION

In some examples, the present invention is directed to interlock systems and apparatus, comprising a physical interlock component, that prevent the simultaneous activation of navigational and safety equipment on opposing or conflicting airfield runways. Such navigational and safety equipment may include runway lighting, visual navigation aids, and instrument landing systems.

While the physical interlock described herein may be applicable to any navigational or safety component, particularly one that is a component of an (ICMS®) integrated control and monitoring system, in preferred embodiments, the invention may include apparatus, equipment and methods drawn to ILS interlock systems that prevents the simultaneous activation of ILS equipment on opposing or conflicting airfield runways. By "ILS" is meant a ground (or ship)-based instrument approach system that provides precision guidance to an aircraft approaching and landing on a runway, using a combination of radio signals and, in many (but not all) cases, high-intensity lighting arrays to enable a safe landing during instrument meteorological conditions (IMC), such as low ceilings or reduced visibility due to fog, rain, or blowing snow. Typically, runways have two (or sometimes more) ILS, with each ILS positioned to radiate radio waves to ILS receivers located on aircraft approaching the runway from one direction. One example of a system employing more than one ILS is disclosed in Uemura, U.S. Pat. No. 6,348,891, hereby incorporated herein by reference in its entirety.

An ILS may radiate two kinds of signals. A "localizer" comprises an antenna array normally located beyond the departure end of the runway and generally consists of several pairs of directional antennas. Two signals are transmitted from co-located localizer antennas; one is modulated at a frequency of 90 Hz, the other is modulated at 150 Kz. Each antenna transmits a narrow beam, one slightly to the left of the runway centerline, the other slightly to the right. The localizer receiver on the aircraft detects the two signals and calculates the difference in the depth of modulation ("DDM") of the 90 Hz and 150 Hz signals. The difference between the two signals varies depending on the deviation of the approaching aircraft from the centerline. If there is a predominance of either 90 Hz or 150 Hz modulation, the aircraft is off the centerline, and the pilot or automatic pilot may correct the approach flightpath by steering either right or left to assure a centerline approach.

An ILS "glide slope" signal is generated, for example, by a glide slope ("GS") station is an antenna array sited to one side of the runway touchdown zone. The GS signal is transmitted on a carrier frequency using a technique employing 90 Hz and 150 Hz signals, similar to that for the localizer, but in the vertical plane. The center of the glide slope signal is arranged to define a glide path of approximately 3° above horizontal (ground level). The pilot controls the aircraft so that the glide slope indicator remains centered on the display to ensure the aircraft is following the glide path to remain above obstructions and reach the runway at the proper touchdown point (i.e., it provides vertical guidance).

Clearly, it is extremely important that only one ILS at a time be operational at a single runway. Not only would multiple simultaneously operating ILS on a single runway potentially guide approaching opposing aircraft into a collision, but since each ILS would be radiating radio waves in at least partly opposing directions, the opposing signals could create interference in these waves, resulting in an approaching aircraft detecting signals having artifacts and deviations caused by this interference, with potentially dangerous consequences.

In recognition of this danger, the U.S. Federal Aviation Administration (FAA) has required that an ILS must use an interlock system to prevent more than one ILS from radiating opposite approaches to the same runway; the interlock system would interface more than one ILS, and would be controlled by air traffic personnel. However, there is not a common specification for controlling an ILS, and different manufacturers use different methods for interlocking the system.

As referenced above, part of the function of the ICMS system is to provide a fail-safe interlock of opposing runway visual and navigational aids, so that if the traffic direction on a physical runway is changed, ICMS refuses to turn on the equipment used with the new traffic direction (the new virtual runway), such as the ILS localizer and glide slope transmitters, until the previous virtual runway has shut down. However, previously these ICMS interlocks have been computer-controlled.

Purely software-based ILS interlocks may have a number of disadvantages; if the software becomes unstable (for example, due to human error), or in the event of unauthorized access to the software system by an intruder, the ILS interlock may fail to function as designed, and the system as a whole may have a Potential for Hazardously Misleading the Information (HMI) of aircraft.

The present invention solves these problems by providing an ILS interlock system that is not wholly software-based; in preferred examples, the invention may be drawn to interlock methods, systems, and apparatus involving at least one physical fail-resistant or fail-safe component, such as a physical switch component. In a preferred example, such methods, systems and apparatus removes the possibility of opposing ILS being active simultaneously.

Preferably, the present ILS interlock system is capable of being used in conjunction with any of a variety of different ILS equipment, thus providing a flexible system that can be used in conjunction with the control and monitoring of any airfield.

Preferably, although not always invariably, the ILS interlock systems and apparatus of the present invention are capable of interfacing with an integrated control and monitoring system (ICMS), linking substantially all, or all, runway visual aids and navigational aids to aircraft guidance and safety at airports, and preferably in which no single component or communications failure can adversely affect the functionality of the system. In certain examples, the present invention may be directed to methods, systems, and apparatus comprising an ICMS system operatively linked to a ILS interlock apparatus involving at least one physical fail-resistant or fail-safe component, such as a physical switch component. Preferably, the ILS interlock apparatus of the present invention is itself a panel or other physical object.

By "physical" is meant pertaining to an actual object occupying three-dimensional space, as opposed to a virtual object or other "object" not actually existing in physical space.

In a preferred example, the ILS interlock apparatus comprises a physical relay component, such as a dual coil, magnetic latching relay operating under a voltage; preferably the voltage is 24V DC. In this example, the relay contains two coils, each producing an electromagnetic field when energized. The relay component may also comprise two sets of contacts to convert input opposing ILS interlock control signals in the ICMS system to a single integral three pole physical interlock. The relay component may comprise a device such as the Tyco Model KUL-11D15D-24 dual coil 24V Relay (TE Connectivity, Berwyn, Pa. 19312).

In one example of the present invention, each ICMS ILS interlock control signal is directed via a separate latching interlock opto isolator component to the LATCH and RESET coils of the relay component. The two outputs of the two latching interlock opto isolator components are directed through two separate diodes arranged as an "OR gate", positioned between the opto isolators and the LATCH and RESET coils. This is done so that if both ICMS signals are off (such as is the case when the entire runway is turned off), neither ILS control will be enabled. Based on the state of the relay component, the ground will be switched back to the selected ILS control circuit (RINTRA) through each ILS' designated pin of the relay component contacts. Preferably the same pins are also routed back to the ICMS so that the ICMS system can monitor the state of each ILS through these contacts. Also preferably, the same pins are routed to the RCUs as the signal for the opposing interlocked ILS RCSU (remote control and status unit) (RINTRB) through diodes, such as Schottky diodes, to minimize the forward voltage drop going back as the RINTRB signal.

By this design, only one of the RINTRA signals may be active at a time, by virtue of the fact that the ground signal can only be switched to ILS or the other, but not both. In the event that there is no ICMS ILS signal for any ILS allows both RINTRA signals to float (turn off) thereby shutting both ends of the runway.

Similarly, if both ICMS interlock controls were active simultaneously, the relay will remain latched in the state conferred by the first ICMS signal to reach the interlock, and will not switch until that control is removed. Since there is only one interlock ground signal to be switched to the selected ILS, the present invention makes it impossible to have both ILS output signals enabled simultaneously.

Furthermore, when connected to the ICMS Controller, if the relay component fails entirely and will not switch, this will be detected by the Controller, which will turn off both controls thereby removing the ground signal feeding both Form C contacts. If the Controller fails, the opto isolators are also turned off, thereby removing the source of the RINTRA grounds.

Preferably the relay component is designed to have high reliability and electrical and mechanical lifetime, such as between about 100,000 and about 10,000,000 operations.

In a preferred configuration, the ILS interlock system of the present invention also has lights or LEDs to indicate which end of the runway is active, as well as a lamp test switch to test the condition of the lights or LEDs. The LEDs are part of the same circuit as the interlock; thus both can be off simultaneously.

In a preferred example, the various possible combinations of conditions and their explanations and results in the ILS interlock of the present invention are shown in Table 1, below.

TABLE 1

| Item | ICMS Control A | ICMS Control B | Relay Contact A | Relay Contact B | Explanation |
|---|---|---|---|---|---|
| 1 | OFF | OFF | OFF | OFF | Normal Operation |
| 2 | ON | OFF | ON | OFF | Normal Operation |
| 3 | OFF | ON | OFF | ON | Normal Operation |
| 4 | ON | ON | ON | OFF | Normal Operation (A activated first) |
| 5 | ON | ON | OFF | ON | Normal Operation (B activated first) |
| 6 | Either | Either | ON | ON | Internal Relay Failure; monitored by ICMS shutting down both ILS |

Certain software and hardware modifications to a currently existing ICMS concentrator (disclosed in e.g., U.S. Pat. No. 6,604,030) may be made to support the use of the exemplified ILS interlock system. The standard output module currently used in the ICMS interlock controls may be changed to, for example, a Brentek G-1AMP5-LTCH (Latching 1 Amp Dry Output 5 v Logic), or an equivalent that uses a set of dry relay contacts. In this example, the current output has a forward voltage drop of 1.6 VDC; the G-1AMP5-LTCH has a forward voltage drop of 0 VDC. These characteristics keep the ground well below +2.5 VDC. Also, the two opto isolators used to monitor the RINTRA contacts of the relay component must be added. Corresponding modification of ICMS software should also be made.

Integration of the physical interlock, such as the ILS interlock, of the present invention as part of an airfield or runway integrated control and monitoring system provides the clear advantages of an ICMS (including a single interface and control module for all runway navigational and safety equipment) with such a physical interlock feature.

If a facility has more runways than can be handled by a single ICMS interlock panel assembly, multiple interlock panel assemblies may be used, for example, they may be daisy-chained together.

Thus, in one example, the invention comprises a system for preventing more than one instrument landing system (ILS) from being active on a physical airport runway at the same time, comprising:
a first input signal indicating that a first ILS, guiding air traffic approaching said runway from a first direction, is selected;
a second input signal indicating that a second ILS, guiding air traffic approaching said runway from a second direction, other than said first direction, is selected; and
an interlock relay configured to receive said first input signal and second input signal, said relay comprising one or more physical switch, and structured to:
 a) send a first activating output signal to said first ILS, and prevent a second activating output signal being sent to said second ILS, when said first input signal indicates that said first ILS is selected;
 b) send a second activating output signal to said second ILS, and prevent a first activating output signal being sent to said first ILS, when said second input signal indicates that said second ILS is selected;
 c) prevent a first activating output signal and a second activating output signal being sent to said first ILS and said second ILS, respectively, if neither a first input signal or a second input signal are received by said interlock relay; and
 d) maintain an activating output signal to a first-selected ILS if both said first input signal and said second input signal are received by said interlock relay;
wherein said interlock relay is connected to said first ILS and said second ILS in a manner such that, if a first activating output signal is sent by said interlock relay to said first ILS system, said first ILS system is activated, and if second activating output signal is sent by said interlock relay to said second ILS system, said second ILS system is activated.

In this example, preferably the first and second input signals are directly or indirectly sent or derived from an ICMS ILS interlock. For example, the first and second input may be the result of a signal originating from an ICMS through an opto isolator connection to an isolated circuit operating under a voltage provided by a power source, such as a DC power source.

A first and second activating output signal is a signal that has been routed through the relay and is being sent to the selected first or second ILS by the relay.

Preferably, in this example, if the interlock relay sends a first activating output signal to said first ILS, the interlock relay also simultaneously sends a first inactivating output signal to said second ILS. Similarly, if the interlock relay sends a second activating output signal to the second ILS, said interlock relay simultaneously sends a second inactivating output signal to said first ILS. The first and second inactivating output signals are this directed to the unselected ILS by the interlock at the same time that the selected ILS is activated, telling the unselected, opposing ILS to become, or to remain, inactivated.

To prevent simultaneous activating signals from being sent to more than one ILS on a single physical runway the ILS may be structured so that, when an input signal is conveyed to the interlock relay, a power source-activated current is initiated, sending electrical current to an electromagnetic coil, which causes said physical switch to simultaneously i) select a route sending an activating output signal to the selected ILS; and ii) deselect other possible current routes which would send an activating output signal to any other ILS.

An example of the invention of the present application may also be described as an ILS interlock panel assembly, comprising
 a) at least one pair of connections for a corresponding one or more pairs of ILS-activating control input signals; wherein each such pair of ILS-activating control input signals regulates ILS systems on a single runway, and wherein a first ILS-activating control input signal of said pair of input signals activates a first ILS system radiating in a direction opposing the direction of radiation of a second ILS system activated by a second ILS-activating control input signal;

b) an interlock relay, configured to receive a first relay signal initiated by said first ILS-activating control input signal and a second relay signal initiated by said second ILS-activating control input signal, said interlock relay comprising a physical switch;

c) a power source connected to a circuit directing an electrical current to a first end of said physical switch; d) a first contact structured to receive and conduct said electrical current from said physical switch when a second end of said physical switch is in contact therewith;

e) a second contact, electrically isolated and physically separated from said first contact, structured to receive and conduct said electrical current from said physical switch when the second end of said physical switch is in contact therewith;

f) a first electromagnetic coil structured to receive said electrical current and attract the physical switch to the first contact when said first relay signal is initiated;

g) a second electromagnetic coil structured to receive said electrical current and attract the physic switch to the second contact when said second relay signal is initiated;

h) a first activating output signal transmitted through a first activating output connector to a first ILS system when electrical current is received by said first contact, and a second activating output signal transmitted through a second activating output connector to a second opposing ILS system when electrical current is received by said second contact;

wherein said physical switch is structured to contact either said first contact or said second contact, but not both said first and second contact simultaneously.

An ILS-activating control input signal comprises, for example, the output of an ICMS system directing a selected ILS to activate.

Another example of the invention may comprise an ICMS system linked to a physical interlock as described herein For example, the invention may comprise a single-fault-impervious integrated control and monitoring system, comprising:

a) a pair of concentrators interchangeably capable of assuming primary and secondary status, respectively;

b) a plurality of workstations, one of said workstations being a Remote Master Workstation;

c) a pair of independent communication paths each interconnecting one of said pair of concentrators with said workstations;

d) each of said pair of concentrators being connected in parallel to a plurality of equipment interfaces arranged to convey equipment data to said concentrators and to convey operational commands from said concentrator to said equipment;

e) said pair of concentrators being so interconnected with each other that whenever one of them is in primary status, the outputs of the other are blocked but its inputs continue to function, and f) a physical ILS interlock comprising
 i) at least one pair of connections for a corresponding one or more pairs of ILS-activating control input signals from each of said pair of concentrators; wherein each such pair of input signals regulates ILS systems on a single runway, and wherein a first input signal of said pair of input signals activates a first ILS system radiating in a direction opposing the direction of radiation of a second ILS system activated by a second input signal;

ii) an interlock relay, configured to receive a first relay signal initiated by said first input signal and a second relay signal initiated by said second input signal, said interlock relay comprising a physical switch;

iii) a power source connected to a circuit directing an electrical current to a first end of said physical switch;

iv) a first contact structured to receive and conduct said electrical current from said physical switch when a second end of said physical switch is in contact therewith;

v) a second contact, physically separated from said first contact, structured to receive and conduct said electrical current from said physical switch when the second end of said physic switch is in contact therewith;

g) a first electromagnetic coil structured to receive said electrical current and attract the physical switch to the first contact when said first relay signal is initiated; and h) a second electromagnetic coil structured to receive said electrical current and attract the physic switch to the second contact when said second relay signal is initiated;

i) a first activating output signal transmitted through a first activating output connector to a first ILS system when electrical current is received by said first contact, and a second activating output signal transmitted through a second activating output connector to a second opposing ILS system when electrical current is received by said second contact;

wherein said physical switch is structured to contact either said first contact or said second contact, but not both said first and second contact simultaneously.

DESCRIPTION OF THE PREFERRED EXAMPLES

The physical ILS interlock system of the present invention is preferably configured to ensure that when a software interlock, such as an ICMS interlock control is applied to an ILS (rendering it "ON"), the opposing runway ILS is locked "OFF".

In a preferred embodiment the ILS interlock system is structured to receive interlock control signals from an ICMS and provide a physical interlock preventing opposing ILS systems on a single runway from being active at the same time. The preferred ICMS Interlock Panel Assembly is configured to accommodate up to 4 physical runways combinations. If a facility has more than four physical runways, additional ICMS Interlock Control Panels may be added to accommodate the additional runways in groups of four.

For example, a facility with one to four physical runways would require only one ICMS Interlock Control Panel; if a facility has from five to eight physical runways, it would require two ICMS Interlock Control Panels; if a facility has between nine and twelve physical runways, it would require three ICMS Interlock Control Panels, etc.

Each ICMS Interlock Panel contains four sets of LED Indicators to reflect which of the two runways of each of the four sets has an active ILS system. If both LEDs are off, then neither runway has an active ILS system, or the circuit is not currently being used. There is also a LAMP TEST button on each panel used to confirm that all of the LED indicators are functional.

In its preferred example, each Interlock Panel Assembly requires 24 volts of direct current (+24 VDC) to power the unit. This supply voltage should be from a dual source redundant DC set of power supplies to ensure that the unit is powered even when one DC source fails. The power can be applied to connector J5. There are three each connector pins for +24 VDC power. This is so it can be daisy chained to additional ICMS Interlock Panels if required.

Figure 1:
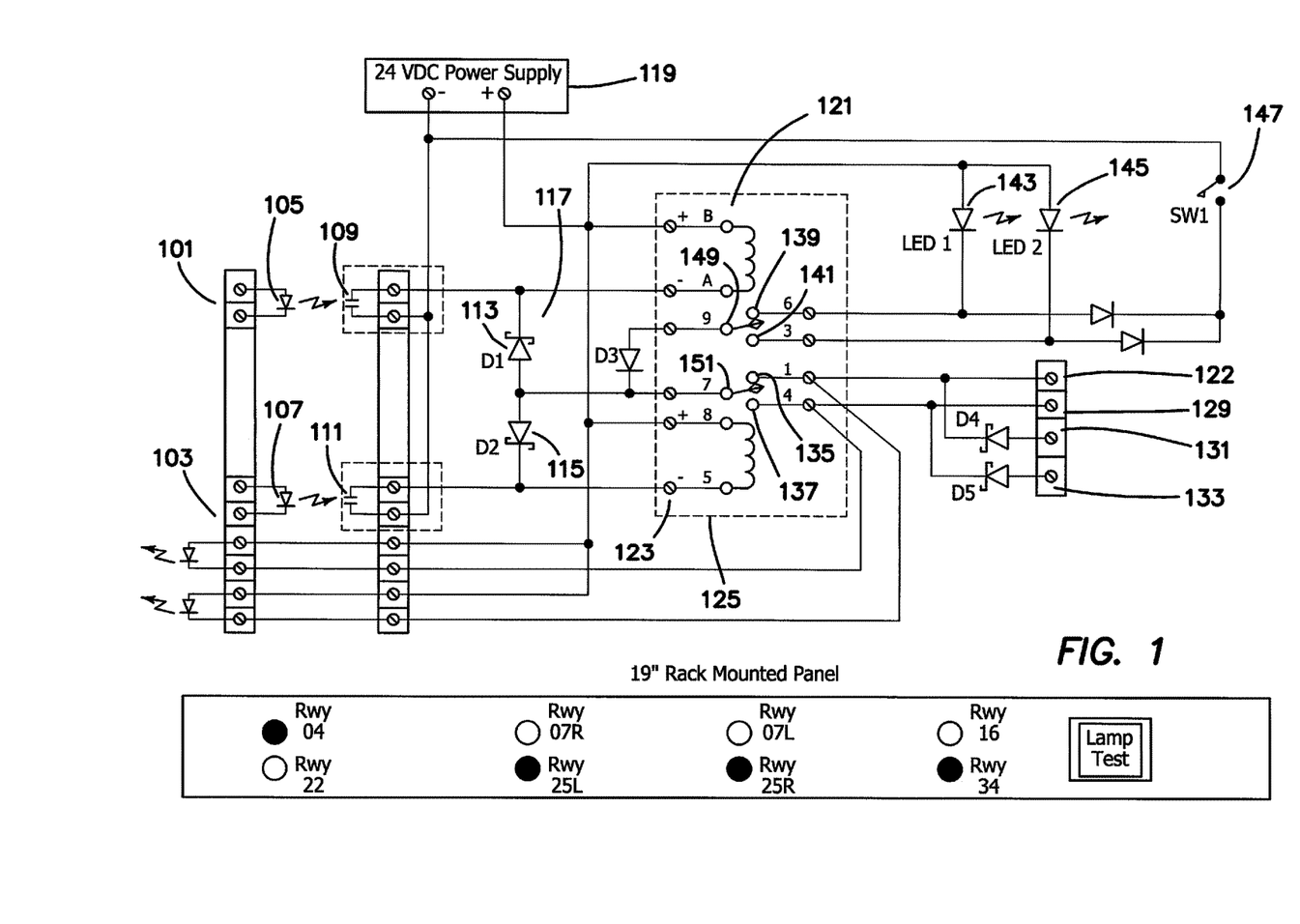
FIG. 1 is a diagram showing the interconnection of an exemplary ILS interlock system of the invention.

Each of the four interlock circuits in the ICMS Interlock Control Panel Assembly contains a dual coil latching relay which is used to convert the ICMS Concentrator's Digital I/O Control circuit's interlock controls from a single threaded control circuit to a true set of Form C contacts which are used to implement the ILS Interlock. In FIG. 1, The ICMS ILS interlock control signal for runway 04 is applied to latching opto isolator component 101; the ICMS ILS interlock control signal for opposing runway 22 is applied to latching opto isolator component 103. Each opto isolator component comprises a photodiode 105, 107 which transmits light to a photo transistor component 109, 111 when the signal is applied; in this event the phototransistor component completes the circuit linking positive and ground poles of the +24 VDC power supply 119. Each of the two outputs of the two latching interlock opto isolator components are directed through different, separate diodes 113, 115 arranged together as an "OR gate" 117, positioned between the opto isolators and the LATCH coil 121 and RESET coil 123 of the latching relay component 125. In this way, if both ICMS signals are off, neither of the two opposing ILS systems will be enabled, since no circuit activating an ILS will be completed. The latching relay component 125 is structured to maintain the last contact state if power is lost or removed.

Based on the state of the relay component 125 and whether latching coil 121 or reset coil 123 is activated, the ground will be electromagnetically switched via switch 149 back to the selected ILS control ("ON") circuit, (runway 04 RINTRA 122 or runway 22 RINTRA 129) through each ILS' designated pin 135 and 137, respectively. Also linked to each runway's RINTRA circuit is the opposing runway's interlocked ILS "OFF" control circuit RINTRB: 131 for runway 22 and 133 for runway 04. Additionally, the same pins 135 and 137 are also routed back to the ICMS system so that ICMS can monitor the actual state of each ILS through these physical contacts.

Also, based on the state of the relay component 125 and assuming the presence of a ICMS ILS control signal from one or the other of opposing runways, pins 139 for runway 04 or 141 for runway 22 ground signals will be activated, thus providing an LED panel light 143, 145 for each ILS active circuit indicating which ILS system is active. A lamp test switch 147 is also preferably routed to each or both pins so that a user can test that each LED is actually operating.

Those of ordinary skill in the art will understand that variations in and deviations from the specific system exemplified herein may be made without departing from the spirit of the invention. For example, and without limitation, a lamp test switch may be routed for each runway LED, rather than a single lamp test switch for two or more LEDs. Additionally, and without limitation, rather than having separate pins (e.g., 139, 141) for activation of the LED panels lights, the LEDs and lamp test switch may be routed via the RINTRA pins 135 and 137 and switch 151, thus further linking function and monitoring functions of the ICMS ILS panel assembly.

Figure 2:
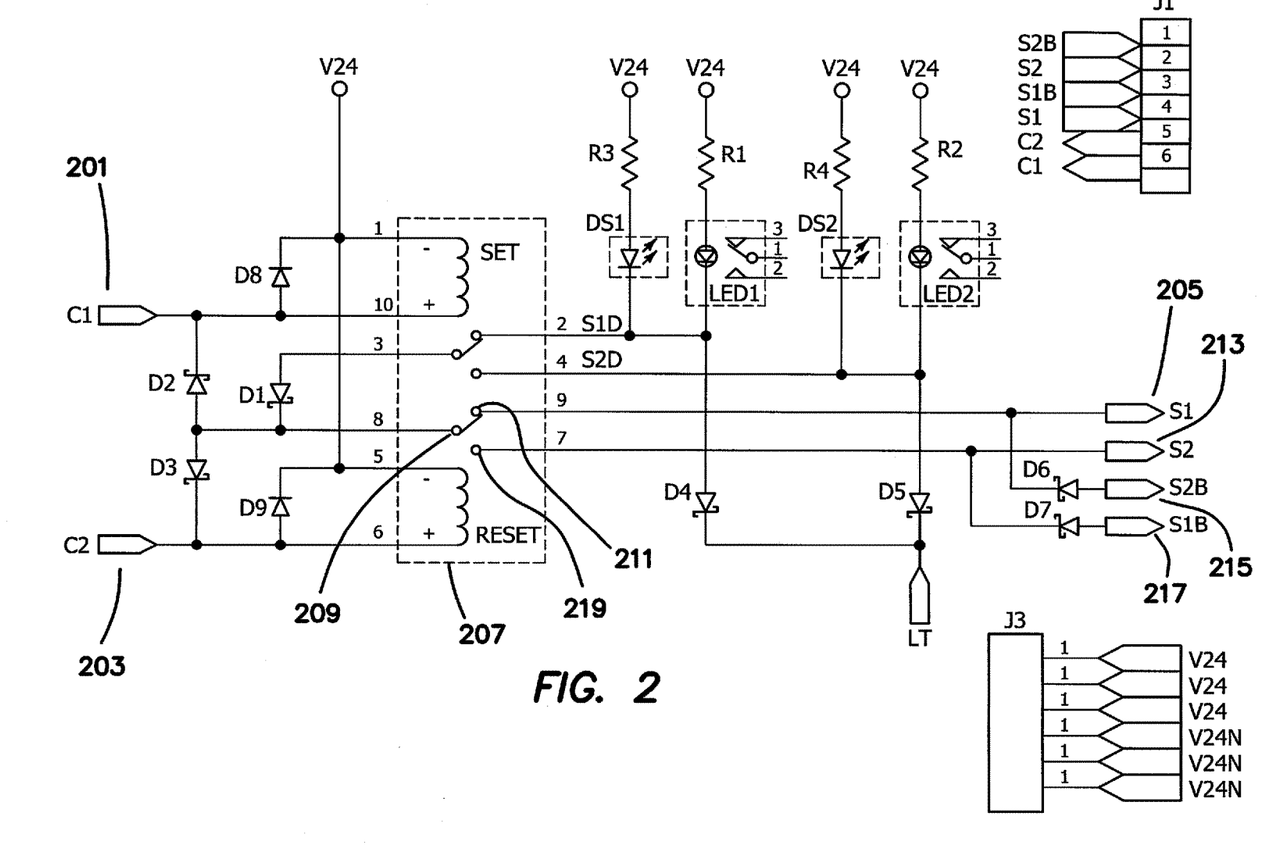
FIG. 2 is a diagram showing the interconnection of another exemplary ILS interlock system of the invention.

FIG. 2 shows another example of the ICMS ILS panel assembly of the present invention. In this example, the interlock control for one of the two interlocked runway ILS's is connected to connector C1 201 and the other interlock control is connected to connector C2 203. The actual ICMS-derived interlock control signal to the active ILS (RINTRA) is signaled via connector S1 205. When this interlock control is applied to connector contact C1 201, the relay component 207 switches to permit pin 209 to engage pin 211, thus sending the ground signal to connector S1 205, and signaling that the runway associated with the ICMS ILS interlock signal at connector 201 is active at RINTRA connector 205. The opposing runway ILS interlock control "OFF" signal, RINTRB at Connector S2B 215 is also grounded and activated when this occurs.

At the same time, neither the ILS interlock control ("ON") RINTRA signal for the opposing runway at Connector S2 213, nor the opposing runway ILS interlock control "OFF" signal, RINTRB at Connector 31B 217 are grounded when pin 209 engages pin 211. Importantly, because of the structure of the ICMS ILS Interlock panel depicted, it is physically impossible to apply the ground to both Connectors S1 and S1B (pin 211 and pin 219 of relay 209) simultaneously.

As long as the ICMS interlock control signal is active at connector C1, the relay will stay in the same latch state, regardless of the state of the opposing connector C2. If the ICMS Interlock Control Signal on connector C1 is removed, then the opposing ICMS Interlock Control Signal, can be applied to connector C2 to activate the opposing ILS.

ICMS Interlock Panel Assembly

The ICMS Interlock Panel Assembly is used to ensure that when an ICMS interlock control is applied to an ILS, the opposing runway ILS remains interlocked OFF.

Each ICMS Interlock Panel Assembly contains provisions to accommodate from one to four physical runway combinations. If a facility has more than four physical runways, additional ICMS Interlock Control Panels may be added to accommodate the additional runways in groups of four. For example, a facility with one to four physical runways will require only one ICMS Interlock Control Panel; if a facility has from five to eight physical runways, it will require two ICMS Interlock Control Panels; if a facility has between nine and twelve physical runways, it will require three ICMS Interlock Control Panels, etc. Each panel contains four sets of LED Indicators to reflect which of the two runways of each of the four sets is active. If both LEDs are off, then neither runway is active or the circuit is not used. There is also a LAMP TEST button on each panel used to confirm that all of the LED indicators are functional. Each Interlock Panel Assembly requires +24 VDC to power the unit. This supply voltage should be from a dual source redundant DC set of power supplies to ensure that the unit is always powered. The power can be applied to connector J5. There are three each connector pins for +24 VDC power. This is so it can be daisy chained to additional ICMS Interlock Panels if required.

Each of the four interlock circuits in the ICMS Interlock Control Panel Assembly contains a dual coil latching relay which is used to convert the ICMS Concentrator's Digital I/O Control circuit's interlock controls from a single threaded control circuits to a true set of Form C contacts which are used to implement the ILS Interlock.

Figure 3:
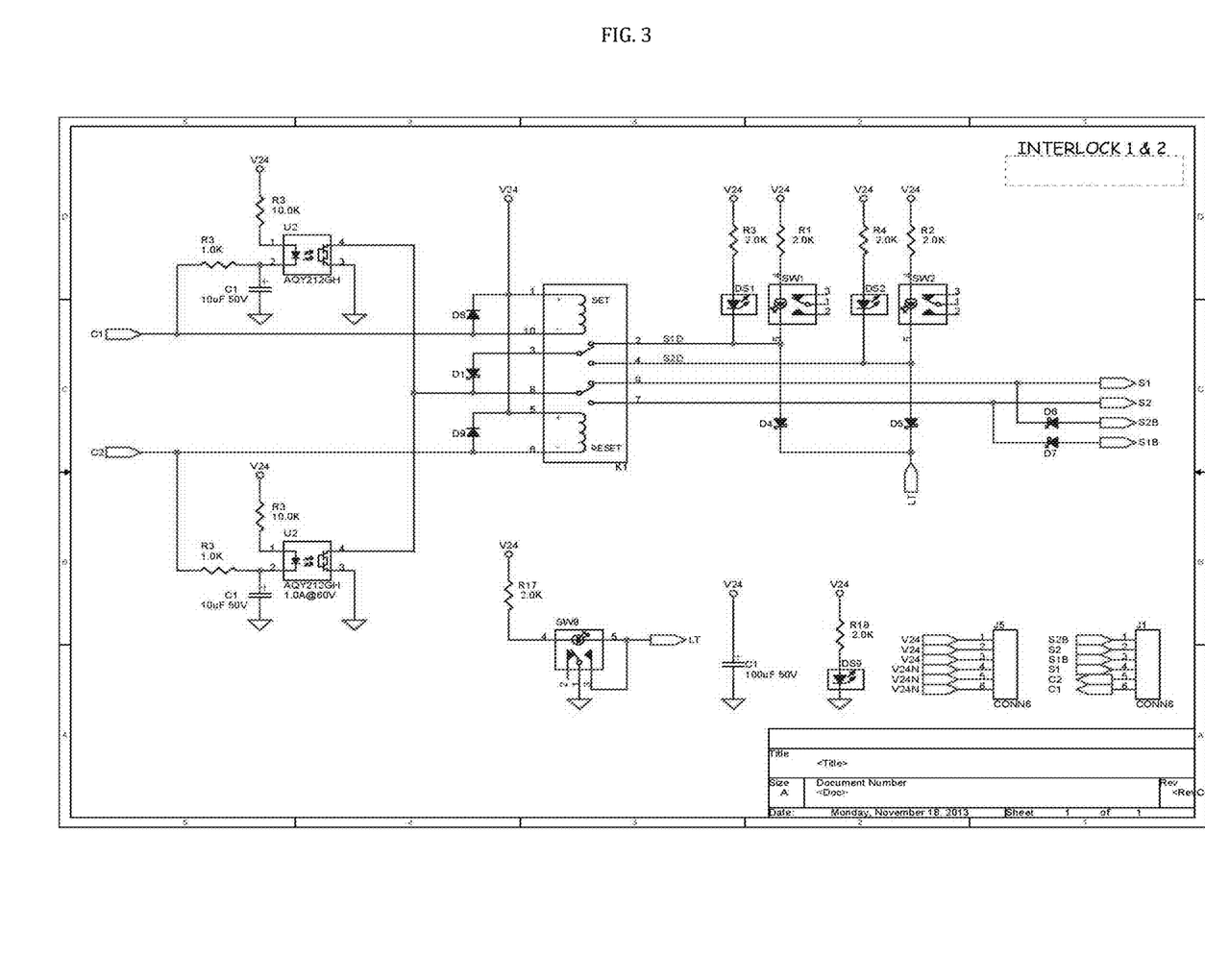
FIG. 3 is a diagram showing a schematic of a further example of the present invention.

In FIG. 3, the Interlock Control for one of the two interlocked runway ILS's is connected to connector C1 and the other interlock control is connected to connector C2. The actual Interlock Control Signals (RINTRA) is derived from connector S1. When the interlock control is applied to connector contact C1, the relay switches to engage the sets of Form C contacts with will allow the ground signal (Pin 8 of Relay K1) to (Pin 9 of Relay K1). There is an OPTO-Isolator (U2) in each of the two Interlock Control signals going to pin 8 which is used to act as a low pass filter that will delay the application of the Interlock Ground signal to the ILS RCSU's. This delay is enough to give the relay time to switch the contact before the ground is applied to the Interlocks. It will also provide some additional noise immunity to the Interlock Panel. The opposing ILS interlock control signal, RINTRB at Connector S1B (Pin 7 of Relay K1) is not grounded. The actual ground signals are derived by connecting the ILS RCSU grounds to the ICMS Concentrator Grounds at the ICMS 66 Blocks.

It is physically impossible to apply the ground to both Connectors S1 and S1B (Pin 9 and Pin 7 of Relay K1 in FIG. 3) simultaneously. As long as the ICMS Concentrator Interlock Control signal is active at connector C1, the relay will stay in the same latch state, regardless of the state of the opposing connector C2. If the ICMS Interlock Control Signal on connector C1 is removed, then the opposing ICMS Interlock Control Signal can be applied to connector C2 to activate the opposing ILS. In the Cleveland ICMS System, these signals for the ILS's on the interlock set of runways 06R and 24L are routed through ICMS at the ICMS 66 Block as indicated in the below diagram.

The other three circuits on this ICMS Interlock Control Panel should be wired in the same way.
1. Interlock Control Signals from the ICMS Concentrator: C1 & C2, Interlock Control Signals to ILS RCSU's: S1 & S1B
2. Interlock Control Signals from the ICMS Concentrator: C3 & C4, Interlock Control Signals to ILS RCSU's: S2 & S2B
3. Interlock Control Signals from the ICMS Concentrator: C5 & C6, Interlock Control Signals to ILS RCSU's: S3 & S3B
4. Interlock Control Signals from the ICMS Concentrator: C7 & C8, Interlock Control Signals to ILS RCSU's: S4 & S4B Based on the current disclosure of examples and the mechanism of the ICMS ILS interlock panel provided herein, the person of ordinary skill in the art would recognize that the present invention may be made and carried out in a variety of additional ways in which the "current" runway's ILS is isolated by means of a physical relay switch from a circuit comprising the opposing "unused" runway's ILS system in a manner preventing the simultaneous activation of both ILS systems.

Accordingly, although there has been hereinabove described specific examples of compositions and methods for an ILS physical interlock device, it will be appreciated that, the invention is not limited to such examples. That is, one or more features of any example or description may be combined with or deleted from one or more features of any other example or description, and remain within the description of the invention. Any range of temperatures, time, or other measurements described in this specification includes all points and subranges within the high and low measurement of the range listed, to $\frac{1}{10}^{th}$ (one decimal place) of a unit of measurement. The present invention may suitably comprise, consist of, or consist essentially of the recited elements. Accordingly, any and all modifications, variations or equivalent arrangements which may occur to those skilled in the art, should be considered to be within the scope of the present invention as defined in the appended claims.

Each and every publication, patent and patent publication cited or mentioned in the present specification is hereby specifically incorporated herein by reference in its entirety as a part of the present specification.

We claim:

1. A system for preventing more than one instrument landing system (ILS) from being active for an airport runway at the same time, comprising:
an integrated control and monitoring system (ICMS), a first ILS, a second ILS, and an interlock relay; wherein said ICMS is configured to generate:
a first input signal indicating that the first ILS, guiding air traffic approaching said runway from a first direction, is selected; and
a second input signal indicating that the second ILS, guiding air traffic approaching said runway from a second direction, other than said first direction, is selected; and
wherein said interlock relay is-configured to receive said first input signal and second input signal, comprises one or more physical switch, and functions to:
   a) send a first activating output signal to said first ILS, and prevent a second activating output signal being sent to said second ILS, when said first input signal indicates that said first ILS is selected;
   b) send a second activating output signal to said second ILS, and prevent a first activating output signal being sent to said first ILS, when said second input signal indicates that said second ILS is selected;
   c) prevent a first activating output signal and a second activating output signal being sent to said first ILS and said second ILS, respectively, if neither a first input signal or a second input signal are received by said interlock relay; and
   d) maintain an activating output signal to a first-selected ILS if both said first input signal and said second input signal are received by said interlock relay;
wherein said interlock relay is connected to said first ILS and said second ILS in a manner such that, if a first activating output signal is sent by said interlock relay to said first ILS system, said first ILS system is activated, and if second activating output signal is sent by said interlock relay to said second ILS system, said second ILS system is activated.

2. The system of claim 1, wherein
if said interlock relay sends a first activating output signal to said first ILS, said interlock relay simultaneously sends a first inactivating output signal to said second ILS; and
if said interlock relay sends a second activating output signal to said second ILS, said interlock relay simultaneously sends a second inactivating output signal to said first ILS.

3. The system of claim 1 wherein,
   a) when the first input signal is conveyed to the interlock relay, a power source-activated current is initiated, sending electrical current to a first electromagnetic coil, which causes said physical switch to simultaneously i) select a route sending said first activating output signal to said first ILS; and ii) deselect a route sending said first activating output signal to said second ILS; and
   b) when the second input signal is conveyed to said interlock relay, a power source-activated current is initiated, sending electrical current to a second electromagnetic coil, which causes said physical switch to simultaneously i) select a route sending said second activating output signal to said second ILS; and ii) deselect a route sending said second activating output signal to said first ILS.

4. The system of claim 1 wherein said first input signal and said second input signal are sent from a networked air traffic integrated control and monitoring system (ICMS).

5. An instrument landing system (ILS) interlock panel assembly, comprising
 a) at least one pair of connections for a corresponding one or more pairs of ILS-activating control input signals; wherein each such pair of ILS-activating control input signals regulates ILS systems on a single runway, and wherein a first ILS-activating control input signal of said pair of input signals activates a first ILS system radiating in a direction opposing the direction of radiation of a second ILS system activated by a second ILS-activating control input signal;
 b) an interlock relay, configured to receive a first relay signal initiated by said first ILS-activating control input signal and a second relay signal initiated by said second ILS-activating control input signal, said interlock relay comprising a physical switch;
 c) a power source connected to a circuit directing an electrical current to a first end of said physical switch;
 d) a first contact structured to receive and conduct said electrical current from said physical switch when a second end of said physical switch is in contact therewith;
 e) a second contact, electrically isolated and physically separated from said first contact, structured to receive and conduct said electrical current from said physical switch when the second end of said physical switch is in contact therewith;
 f) a first electromagnetic coil structured to receive said electrical current and attract the physical switch to the first contact when said first relay signal is initiated; and
 g) a second electromagnetic coil structured to receive said electrical current and attract the physical switch to the second contact when said second relay signal is initiated;
 h) a first activating output connector configured to transmit a first activating output signal to a first ILS system when electrical current is received by said first contact, and a second activating output connector configured to transmit a second activating output signal to a second opposing ILS system when electrical current is received by said second contact;
 wherein said physical switch is structured to contact either said first contact or said second contact, but not both said first and second contact simultaneously.

6. The assembly of claim 5 wherein a first interlock output signal is transmitted through a first interlock output connector to the second ILS system when electrical current is received by said first contact, and a second interlock output signal is transmitted through a second interlock output connector to a first ILS system when electrical current is received by said second contact.

7. The assembly of claim 5 wherein when electrical current is received by said first contact a visual symbol is activated to signal to a user that said first ILS system is activated, and when electrical current is received by said second contact a visual symbol is activated to signal to a user that said second ILS system is activated.

8. The assembly of claim 7 wherein said visual symbol comprises a light-generating device.

9. The assembly of claim 8 wherein said visual symbol comprises an LED.

10. The assembly of claim 5 wherein said power source provides direct current.

11. The assembly of claim 10 wherein said power source provides 24 volts of direct current.

12. A single-fault-impervious integrated control and monitoring system, comprising:
 a) a pair of concentrators interchangeably capable of assuming primary and secondary status, respectively;
 b) a plurality of workstations, one of said workstations being a Remote Master Workstation;
 c) a pair of independent communication paths each interconnecting one of said pair of concentrators with said workstations;
 d) each of said pair of concentrators being connected in parallel to a plurality of equipment interfaces arranged to convey equipment data to said concentrators and to convey operational commands from said concentrator to said equipment;
 e) said pair of concentrators being so interconnected with each other that whenever one of them is in primary status, the outputs of the other are blocked but its inputs continue to function, and
 f) a physical instrument landing system (ILS) interlock comprising
  i) at least one pair of connections configured to transmit a corresponding one or more pairs of ILS-activating control input signals from each of said pair of concentrators; wherein each such pair of input signals regulates ILS systems on a single runway, and wherein a first input signal of said pair of input signals activates a first ILS system radiating in a direction opposing the direction of radiation of a second ILS system activated by a second input signal;
  ii) an interlock relay, configured to receive a first relay signal initiated by said first input signal and a second relay signal initiated by said second input signal, said interlock relay comprising a physical switch;
  iii) a power source connected to a circuit directing an electrical current to a first end of said physical switch;
  iv) a first contact structured to receive and conduct said electrical current from said physical switch when a second end of said physical switch is in contact therewith;
  v) a second contact, physically separated from said first contact, structured to receive and conduct said electrical current from said physical switch when the second end of said physical switch is in contact therewith;
  vi) a first electromagnetic coil structured to receive said electrical current and attract the physical switch to the first contact when said first relay signal is initiated; and
  vii) a second electromagnetic coil structured to receive said electrical current and attract the physical switch to the second contact when said second relay signal is initiated;
  viii) a first activating connector through which is transmitted a first activating output signal to a first ILS system when electrical current is received by said first contact, and a second activating connector through which is transmitted a second activating output signal to a second opposing ILS system when electrical current is received by said second contact;

wherein said physical switch is structured to contact either said first contact or said second contact, but not both said first and second contact simultaneously.

13. The system of claim 12, in which a first interlock output signal is transmitted through a first interlock output connector to the second ILS system when electrical current is received by said first contact, and a second interlock output signal is transmitted through a second interlock output connector to a first ILS system when electrical current is received by said second contact.

14. The system of claim 12, wherein when electrical current is received by said first contact a visual symbol is activated to signal to a user that said first ILS system is activated, and when electrical current is received by said second contact a visual symbol is activated to signal to a user that said second ILS system is activated.

15. The system of claim 12 wherein, when a first activating output signal is transmitted to a first ILS system, a first interlock status signal is sent to said concentrators, and when a second activating output signal is transmitted to a second opposing ILS system, a second interlock status signal is sent to said concentrators.

\* \* \* \* \*